United States Patent
Usui

(10) Patent No.: US 7,215,525 B2
(45) Date of Patent: May 8, 2007

(54) OVERHEAT PROTECTOR FOR A DC-TO-DC CONVERTER OR THE LIKE

(75) Inventor: Hiroshi Usui, Niiza (JP)

(73) Assignee: Sanken Electric Co., Ltd. (JP)

( * ) Notice: Subject to any disclaimer, the term of this patent is extended or adjusted under 35 U.S.C. 154(b) by 72 days.

(21) Appl. No.: 11/056,754

(22) Filed: Feb. 11, 2005

(65) Prior Publication Data

US 2005/0141161 A1 Jun. 30, 2005

Related U.S. Application Data

(63) Continuation of application No. PCT/JP03/10221, filed on Aug. 11, 2003.

(30) Foreign Application Priority Data

Aug. 13, 2002 (JP) ............................. 2002-236135

(51) Int. Cl.
*H02H 5/04* (2006.01)
(52) U.S. Cl. ...................... 361/103; 361/93.1; 361/93.8
(58) Field of Classification Search ............... 361/93.1, 361/103
See application file for complete search history.

(56) References Cited

U.S. PATENT DOCUMENTS 4,977,476 A * 12/1990 Marshall et al. ............... 361/18
5,892,665 A * 4/1999 Matsumoto et al. ....... 363/56.1

FOREIGN PATENT DOCUMENTS

| JP | 3-30782 | 3/1991 |
| JP | 5-040064 | 2/1993 |
| JP | 6-117942 | 4/1994 |
| JP | 7-234162 | 9/1995 |
| JP | 7-297392 | 11/1995 |
| JP | 8-223023 | 8/1996 |
| JP | 2001-045655 | 2/2001 |
| JP | 2001-186760 | 7/2001 |
| JP | 2002-101642 | 4/2002 |
| JP | 2002-136123 | 5/2002 |
| JP | 2002-153052 | 5/2002 |
| JP | 2002-209378 | 7/2002 |

* cited by examiner

*Primary Examiner*—Stephen W Jackson
*Assistant Examiner*—Lucy Thomas
(74) *Attorney, Agent, or Firm*—Woodcock Washburn LLP

(57) ABSTRACT

A Schottky barrier diode is employed for temperature sensing, being capable of indicating temperatures above 110° C. or so by the magnitude of its reverse current. The overheat protector is disclosed as incorporated in a dc-to-dc converter in which, connected in series with the primary winding of a transformer, a current control switch is driven by a switch control circuit so as to hold the converter output voltage constant. The Schottky barrier diode is connected to the gate of a thyristor, triggering the same by its reverse current when a preselected part of the converter, to which the Schottky barrier diode is thermally coupled, heats up to a predetermined limit. The conduction of the thyristor results in disconnection of the switch control circuit from its power supply.

27 Claims, 5 Drawing Sheets

OVERHEAT PROTECTOR FOR A DC-TO-DC CONVERTER OR THE LIKE

CROSS REFERENCE TO RELATED APPLICATIONS

This is a continuation of Application PCT/JP03/10221, filed Aug. 11, 2003, which claims priority to Japanese Patent Application No. 2002-236135 filed Aug. 13, 2002.

BACKGROUND OF THE INVENTION

This invention relates to an overheat protector for use in a variety of electric instruments or appliances. The overheat protector according to the invention is well adaptable for use in a dc-to-dc converter, although no unnecessary limitations to this particular application are intended.

Dc-to-dc converters and the like have so far been protected against overheating by use of temperature sensors such as thermostats and thermistors. The thermistor is classifiable into two types—positive temperature coefficient (PTC) and negative temperature coefficient (NTC). The PTC thermistor is known as a posistor (tradename). As currently placed on the market, the thermostats, thermistors and posistors are all too expensive for the applications envisaged by the instant invention, by reasons of limited productions and very fine temperature control offered. These familiar temperature sensors have therefore added substantively to the manufacturing costs of overheat protectors, as well as to those of the dc-to-dc converters or the like incorporating such protectors.

Use of the Schottky-barrier diode for temperature sensing has recently been suggested by Japanese Unexamined Patent Publication No. 2001-45655. It teaches to measure temperatures on the basis of the temperature-dependent reverse current of a Schottky-barrier diode, switching off the power supply upon detection of a reverse current magnitude in excess of a predetermined limit. This unexamined patent application is silent, however, on how the Schottky-barrier diode is used in an actual dc-to-dc converter or other electric instrument of the type having a current controller and associated control circuit therefore.

SUMMARY OF THE INVENTION

The present invention has it as an object to provide an inexpensive, readily practicable overheat protector incorporating a Schottky-barrier diode for temperature sensing.

Another object of the invention is to adapt the overheat protector for particular use with dc-to-dc converters, in order that they be swiftly and positively set out of operation upon heating up to a predetermined temperature.

Briefly, the present invention may be summarized as an overheat protector for an electric apparatus having current control means for controlling current flow in the apparatus. The overheat protector is perhaps best characterized by use of a Schottky barrier diode for sensing the temperature of a preselected point on (or preselected part of) the electric apparatus by providing reverse current having a magnitude indicative of the temperature of the preselected point or part. Connected to the Schottky barrier diode are voltage application means for applying a reverse voltage thereto, and reverse current detect means for providing a signal indicative of the temperature of the preselected point on the electric apparatus on the basis of the magnitude of the reverse current of the Schottky barrier diode. Overheat protect means is connected to the reverse current detect means for setting the current control means of the electric apparatus out of operation when the temperature of the preselected point on the electric apparatus exceeds a predetermined limit.

The overheat protector of the foregoing construction is disclosed as adapted for dc-to-dc converters in the preferred embodiments which are to be set forth presently. Another aspect of the invention is therefore directed to a dc-to-dc converter protected against overheating, rather than to the overheat protector incorporated therein. The dc-to-dc converter includes a transformer having a primary winding connected across a dc power supply, and a secondary winding connected across an output rectifying and smoothing circuit. Connected in series with the primary winding of the transformer, a main switch as the current control means is conventionally driven by a switch control circuit to hold the converter output voltage constant. The overheat protector with the Schottky barrier diode is incorporated with this dc-to-dc converter, preventing the switch control circuit from driving the main switch when the temperature of the preselected point on the electric apparatus exceeds a predetermined limit.

The Schottky barrier diode is thermally coupled, as by mechanically closely combined, to the main switch in one embodiment of the invention as this switch is most easy to heat up during operation of the converter. However, as in the other embodiments of the invention, the Schottky barrier diode may be thermally coupled to the rectifying diode, which is included in the noted output rectifying and smoothing circuit, or any other part of the converter that will be approximately equal in temperature to the current control switch throughout each run of converter operation.

The Schottky barrier diode for use in the practice of the invention may be such that its reverse current suddenly rises in magnitude in a temperature range of 100 to 150° C. Such Schottky barrier diodes are much cheaper than its conventional counterparts of thermostats, thermistors, and posistors, but just as reliable in operation when used for the purposes of the invention. The heat protector circuitry associated with the Schottky barrier diode is also simple in construction and reliable in operation, so that the heat protector is manufacturable far more inexpensively than heretofore without sacrifice in performance.

The above and other objects, features and advantages of this invention will become more apparent, and the invention itself will best be understood, from a study of the following description and appended claims, with reference had to the attached drawings showing some preferable embodiments of the invention.

DESCRIPTION OF THE PREFERRED EMBODIMENTS

Figure 1:
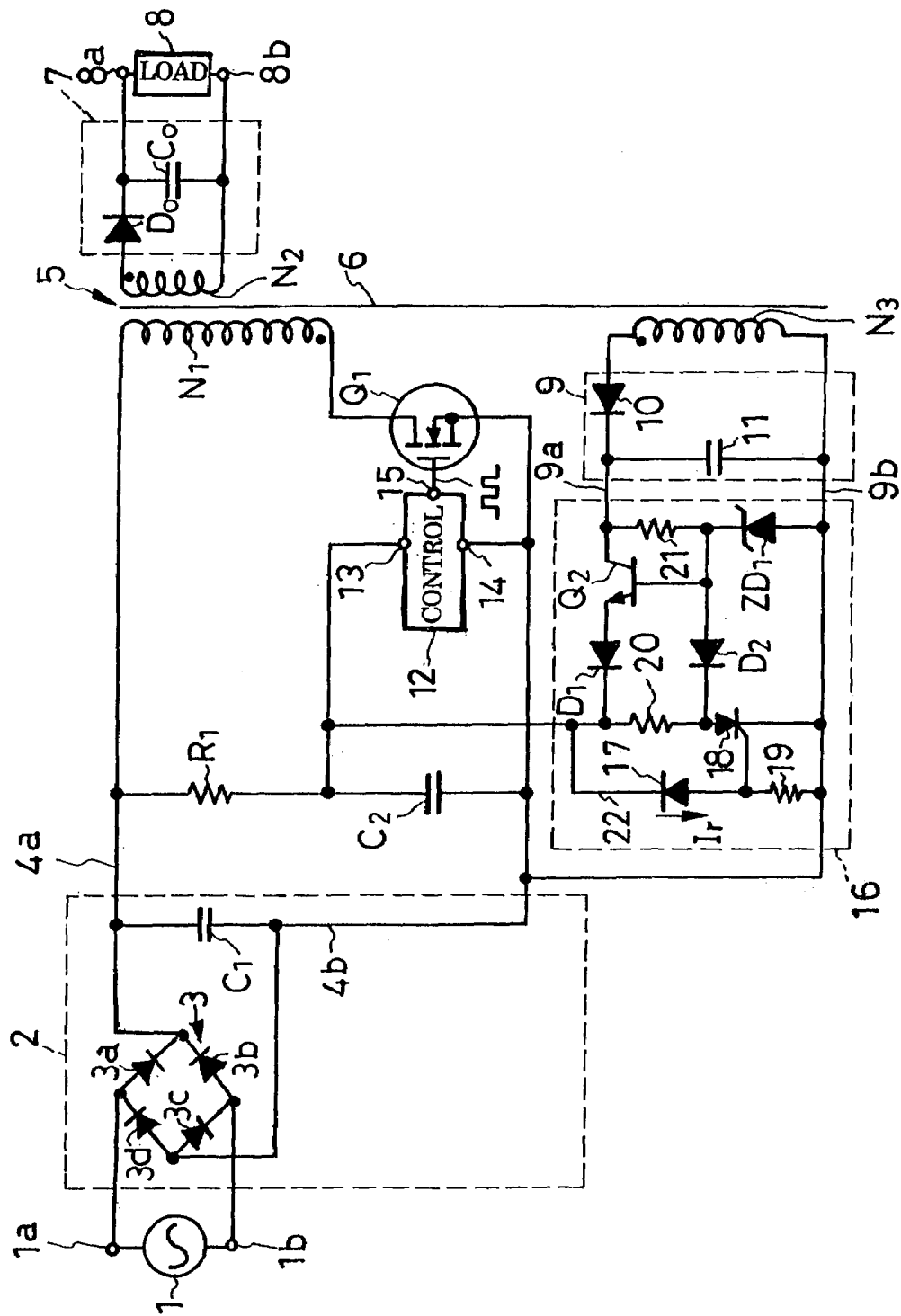
FIG. 1 is a schematic electrical diagram of a first preferred form of overheat-protected dc-to-dc converter embodying the principles of this invention.

The present invention will now be described more specifically in terms of the overheat-protected dc-to-dc converter or dc power supply illustrated in FIG. 1 by way of a representative embodiment of the invention. Shown at 1 in FIG. 1 is a commercial alternating-current source to which there are connected a pair of ac input terminals $1_a$ and $1_b$ of the dc power supply according to the invention. The overheat-protected dc-to-dc converter as the electric apparatus comprises a input rectifying and smoothing circuit 2, a transformer 5, a main switch $Q_1$, as the current control means, an output rectifying and smoothing circuit 7, a switch control voltage rectifying and smoothing circuit 9, a switch control circuit 12, an overheat protector constituting the gist of the instant invention, a capacitor $C_2$, and a startup resistor $R_1$. The input rectifying and smoothing circuit 2 is connected to the pair of ac input terminals $1_a$ and $1_b$ for translating the input ac voltage into a dc voltage. The input rectifying and smoothing circuit 2 is shown as a combination of a rectifier circuit 3 connected directly to the pair of ac input terminals $1_a$ and $1_b$, and an input smoothing capacitor $C_1$ connected between the pair of dc output lines $4_a$ and $4_b$ of the rectifier circuit. The rectifier circuit 3 takes the form of a bridge network of four diodes $3_a$, $3_b$, $3_c$ and $3_d$ for full-wave rectification of the ac input.

The main switch $Q_1$ is seen a field-effect transistor $Q_1$ or like switching device. The main switch $Q_1$ for controlling current flow in the apparatus is connected between the pair of dc output conductors $4_a$ and $4_b$ of the input rectifying and smoothing circuit 2 via the primary winding $N_1$ of a transformer 5.

The transformer 5 additionally comprises a secondary winding $N_2$ and tertiary winding $N_3$ which are both electromagnetically coupled to the primary winding $N_1$ via a magnetic core 6. The transformer secondary $N_2$ is connected to the output rectifying and smoothing circuit 7 and thence to a load 8. The output rectifying and smoothing circuit 7 is shown as a combination of a rectifying diode $D_0$ and smoothing capacitor $C_0$. The smoothing capacitor $C_0$ is connected in parallel with the transformer secondary $N_2$ via the rectifying diode $D_0$. The transformer secondary $N_2$ and rectifying diode $D_0$ are so polarized in relation to each other that the rectifying diode conducts during the nonconducting periods of the main switch $Q_1$. An alternate construction is possible, however, in which the rectifying diode $D_0$ conducts during the conducting periods of the main switch $Q_1$. The smoothing capacitor $C_0$ has its opposite polarity terminals connected respectively to the pair of dc output terminals $8_a$ and $8_b$ between which is shown connected the load 8. The four diodes $3_a$–$3_d$ of the input rectifier circuit 3 and the diode $D_0$ of the output rectifying and smoothing circuit 7 are all connected to the main current path of the dc-to-dc converter for rectification.

The switch control voltage rectifying and smoothing circuit 9 is connected across the transformer tertiary $N_3$ for providing a dc voltage for on-off control of the main switch $Q_1$. This rectifying and smoothing circuit 9 is also a combination of a rectifying diode 10 and smoothing capacitor 11.

The smoothing capacitor 11 is connected in parallel with the transformer tertiary $N_3$ via the rectifying diode 10. The rectifying diode 10 and transformer tertiary $N_3$ are so polarized in relation to each other that the rectifying diode 10 conducts during the nonconducting periods of the main switch $Q_1$.

For on-off control of the main switch $Q_1$ the switch control circuit 12 is connected to its control terminal which in this case is the gate of the FET shown. The switch control circuit 12 can be of any known or suitable design, so that here are shown only its pair of supply voltage input terminals 13 and 14 and output terminal 15. A duration-modulated pulse signal or pulse width modulation signal is conventionally applied from the output terminal 15 of the switch control circuit 15 to the control terminal of the main switch $Q_1$.

The capacitor $C_2$ is provided in addition to the switch control voltage rectifying and smoothing circuit 9 for feeding the switch control circuit 12 with a DC voltage. The capacitor $C_2$ has its pair of opposite polarity terminals connected respectively to the pair of supply terminals 13 and 14 of the switch control circuit 12 on one hand and, on the other, to the noted pair of dc output conductors $4_a$ and $4_b$ of the input rectifying and smoothing circuit 2 via the startup resistor $R_1$. This resistor $R_1$ provides a charging circuit at the time of startup. The switch control voltage rectifying and smoothing circuit 9 is connected both across the capacitor $C_2$ and across the switch control circuit 12 via a transistor $Q_2$ and diode $D_1$ which are both to be set forth in detail presently.

The overheat protector 16 includes a Schottky barrier diode 17 which, perhaps in combination with a conductor 22 and reverse current detect resistor 19, constitutes means for temperature sensing in place of its more expensive, more conventional counterparts such as a thermostat, thermistor, or posister set forth in conjunction with the prior art.

Functionally closely associated with the Schottky barrier diode 17 is a thyristor 18 which is to be triggered into conduction by the reverse current $I_r$ of the Schottky barrier diode when its temperature rises above a prescribed limit. The thyristor 18 has its anode or first terminal connected both to one terminal of the capacitor $C_2$ and to the supply terminal 13 of the switch control circuit 12 via a resistor 20, its cathode or second terminal connected both to the other terminal of the capacitor $C_2$ and to the other supply terminal 14 of the switch control circuit 12, and its control terminal connected to the reverse current detect resistor 19.

The thyristor 18 upon conduction short-circuits the pair of supply terminals 13 and 14 of the switch control circuit 12 thereby preventing this circuit from driving the main switch $Q_1$ and so setting the complete apparatus out of operation to avoid any further heating. Thereafter the main switch $Q_1$ remains unactuated, and the transformer primary $N_1$ unenergized, until the heating of the dc-to-dc converter is eliminated as by human intervention. The thyristor 18 is referred to as the overheat protect switch in the claims appended hereto. More will be said presently about how the overheat protector 16 operates.

Still another important component of the overheat protector 16 is the aforesaid npn transistor $Q_2$ which also serves as a switch (referred to as the switch control power supply cutoff switch), preventing the capacitor $C_2$ and switch control circuit 12 to be fed from the switch control voltage rectifying and smoothing circuit 9 in the event of overheating. The transistor $Q_2$ has its collector connected to the output conductor $9_a$ of the rectifying and smoothing circuit 9, its emitter connected via the diode $D_1$ both to one terminal of the capacitor $C_2$ and to the supply terminal 13 of the switch control circuit 12, and its base connected both to the output conductor $9_a$ of the rectifying and smoothing circuit 9 via a resistor 21 and to the anode of the thyristor 18 via a diode $D_2$. A zener diode $ZD_1$ is connected for voltage regulation between the base of the transistor $Q_2$ and the conductor $9_b$ which is understood to be grounded, although this zener diode is unnecessary if constant-voltage control by the transistor $Q_2$ is not required.

Both transistor $Q_2$ and diode $D_1$ conduct, causing the capacitor $C_2$ to be charged, when the voltage between the pair of output conductors $9_a$ and $9_b$ is higher than the voltage across the capacitor $C_2$. The output voltage of the transistor $Q_2$ is regulated by the zener diode $ZD_1$. Having its base connected to the anode of the thyristor 18 via the diode $D_2$, the transistor $Q_2$ is nonconductive when the thyristor 18 is conductive.

As is well known, the Schottky barrier diode 17 is built upon the Schottky theory, utilizing the reaction between silicon or Group III–V compound semiconductor and a metal for rectification. The cathode of the Schottky barrier diode 17 is connected both to one terminal of the capacitor $C_2$ via the conductor 22 as the voltage application means and to the output conductor $9_a$ of the switch control voltage rectifying and smoothing circuit 9 via the diode $D_1$ and transistor $Q_2$. The anode of the Schottky barrier diode 17 is connected both to the gate of the thyristor 18 and, via the reverse current detect resistor 19 as reverse current detect means, to the other terminal of the capacitor $C_2$ and the other output conductor $9_b$ of the rectifying and smoothing circuit 9. The conductor 22 through which the Schottky barrier diode 17 is connected to the capacitor $C_2$ and rectifying and smoothing circuit 9 provides a means for application of a reverse voltage to the Schottky barrier diode 17. Connected in series with the Schottky barrier diode 17, the reverse current detect resistor 19 serves as aforesaid for detection of the reverse current of the Schottky barrier diode.

Operation

Figure 2:
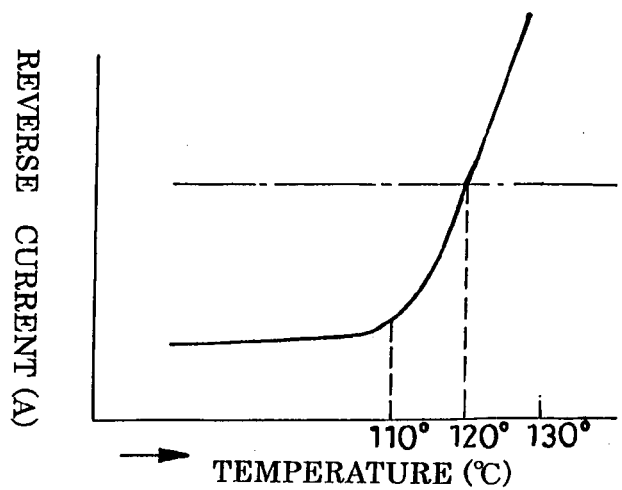
FIG. 2 is a graph plotting the curve of the reverse current of the Schottky barrier diode against temperatures.

The present invention relies for temperature sensing upon the fact that, as graphically represented in FIG. 2, the reverse current (i.e. leakage current) of the Schottky barrier diode 17 is temperature-dependent and rises suddenly in a temperature range of 110–130° C. This temperature range coincides with that in which the overheat protector of the dc-to-dc converter should be tripped. Although the dc-to-dc converter or any other electric devices to which the invention is applicable are not immediately to start smoking or firing in that temperature range, it is desirable that they be set out of operation when heated to a temperature range appropriately below their smoking or firing temperatures. From 110 to 130° C. is, by chance, that optimal temperature range for triggering off the overheat protector by way of precaution against overheating and contingencies thereof.

The Schottky barrier diode 17 may be installed in any position inside or outside the casing of the dc-to-dc converter where it will most efficaciously sense overheating. One recommended positioning of the Schottky barrier diode 17 is its thermal coupling to the main switch $Q_1$ which will most quickly heat up during operation of the dc-to-dc converter. However, a direct thermal coupling of the Schottky barrier diode to the current control switch, or to any other circuit element or heat radiator, is not a requirement; instead, it may be positioned to sense the ambient, or internal environmental, temperature of the apparatus.

In operation, upon connection of the pair of ac input terminals $1_a$ and $1_b$ to the ac source 1, or upon closure of the unshown power switch following the connection of the ac input terminals to the ac source, the capacitor $C_2$ will be charged via the startup resistor $R_1$. The switch control circuit 12 will start controlled actuation of the main switch $Q_1$ when the voltage across the capacitor $C_2$ rises to a predefined value. The diode $D_0$ of the output rectifying and smoothing circuit 7 and the diode 10 of the switch control voltage rectifying and smoothing circuit 9 will be both nonconductive during the conducting periods of the main switch $Q_1$, so that energy will be stored on the transformer 5 during such periods. The energy thus stored will be released each time the main switch $Q_1$ opens, causing the capacitor $C_0$ of the output rectifying and smoothing circuit 7 to be charged via the diode $D_0$, and the capacitor 11 of the switch control voltage rectifying and smoothing circuit 9 to be charged via the diode 10.

It is understood that, as is conventional in the art, an output detector circuit is connected between the pair of output terminals $8_a$ and $8_b$ for feedback control of the main switch $Q_1$. The switch control circuit 12 responds to the output from the unshown output detector circuit for generating switch control pulses having durations modulated accordingly. The duration-modulated switch control pulses are impressed to the main switch $Q_1$ thereby causing the same to turn on and off so as to hold the converter output voltage constant.

Thus, as the voltage between the pair of converter output terminals $8_a$ and $8_b$, or that across the capacitor $C_0$ of the output rectifying and smoothing circuit 7, becomes constant, so does the voltage across the capacitor 11 of the switch control voltage rectifying and smoothing circuit 9. The transistor $Q_2$ and diode $D_1$ of the overheat protector 16 will both conduct, causing the capacitor $C_2$ to be charged from the switch control voltage rectifying and smoothing circuit 9, when the voltage across the capacitor 11 grows higher than that across the capacitor $C_2$.

During the normal operation of the dc-to-dc converter, with the Schottky barrier diode 17 held not more than the predetermined protector-tripping temperature of, say, 120° C., the reverse current $I_r$ of the Schottky barrier diode will remain short of the trigger level of the thyristor 18 of the overheat protector 16. The thyristor 18 will therefore remain nonconductive as long as the temperature of the Schottky barrier diode 17 is 120° C. or less.

Triggered by the reverse current $I_r$ of the Schottky barrier diode 17, the thyristor 18 will turn on when the temperature of the Schottky barrier diode rises above 120° C. Conduction through the thyristor 18 will occur as the trigger current of the thyristor flows through the Schottky barrier diode 17 into the thyristor from its gate toward its cathode. In other words, with an increase in the reverse current $I_r$ of the Schottky barrier diode 17, the voltage across the resistor 19 and the gate-cathode voltage of the thyristor 18 will both develop, with the consequent flow of gate current of sufficient magnitude to cause conduction through the thyristor. As is well known, the thyristor 18 upon conduction remains conductive until the current that has held it conductive diminishes and becomes incapable of doing so.

The diode $D_2$ of the overheat protector 16 will be forward biased and turn on upon conduction of the thyristor 18. Thereupon the transistor $Q_2$ of the overheat protector 16 will turn off thereby suspending current flow from the switch control voltage rectifying and smoothing circuit 9 to both capacitor $C_2$ and switch control circuit 12. At the same time, short-circuited by the thyristor 18 via the resistor 20, the capacitor $C_2$ will discharge through the resistor 20 and thyristor 18. With a consequent drop in the voltage across the capacitor $C_2$ and that between the pair of supply terminals 13 and 14 of the switch control circuit 12, this circuit will be prevented from driving the main switch $Q_1$. The dc-to-dc converter has now been set out of operation to forestall hazards that might result from any further overheating.

Since the thyristor 18 will remain conductive as aforesaid by being energized by the current flowing through the startup resistor $R_1$, the dc-to-dc converter will stay in the above state of overheat protection until either the pair of input terminals $1_a$ and $1_b$ are disconnected from the ac source 1, or the unshown power switch is manipulated to turn off the converter. The thyristor 18 will become nonconductive when the apparatus is powered off by either of these two methods. The overheat protector will stand by pending the detection of overheating by the Schottky barrier diode 17 upon resumption of dc-to-dc converter operation.

It is clear from the foregoing that the invention makes use of a Schottky barrier diode in place of the thermostat, thermistor, or posistor which has been conventionally employed for temperature sensing. Handling small signals, the Schottky barrier diode is cheaper than its conventional counterparts but no less reliable in operation. Overheat protection is positively accomplished, moreover, by causing conduction through the thyristor 18 upon detection of a preset overheat temperature by the Schottky barrier diode and hence by preventing the switch control circuit 12 from actuating the main switch $Q_1$. The overheat protector according to the invention is therefore manufacturable more compactly and inexpensively than heretofore.

It will also be appreciated in conjunction with the FIG. 1 embodiment that the thyristor 18 provides a discharge path for the capacitor $C_2$. Further the feeding of the capacitor $C_2$ and switch control circuit 12 from the switch control voltage rectifying and smoothing circuit 9 is suspended by the nonconduction of the transistor $Q_2$. For these reasons the dc-to-dc converter is saved from overheating both quickly and positively.

Figure 3:
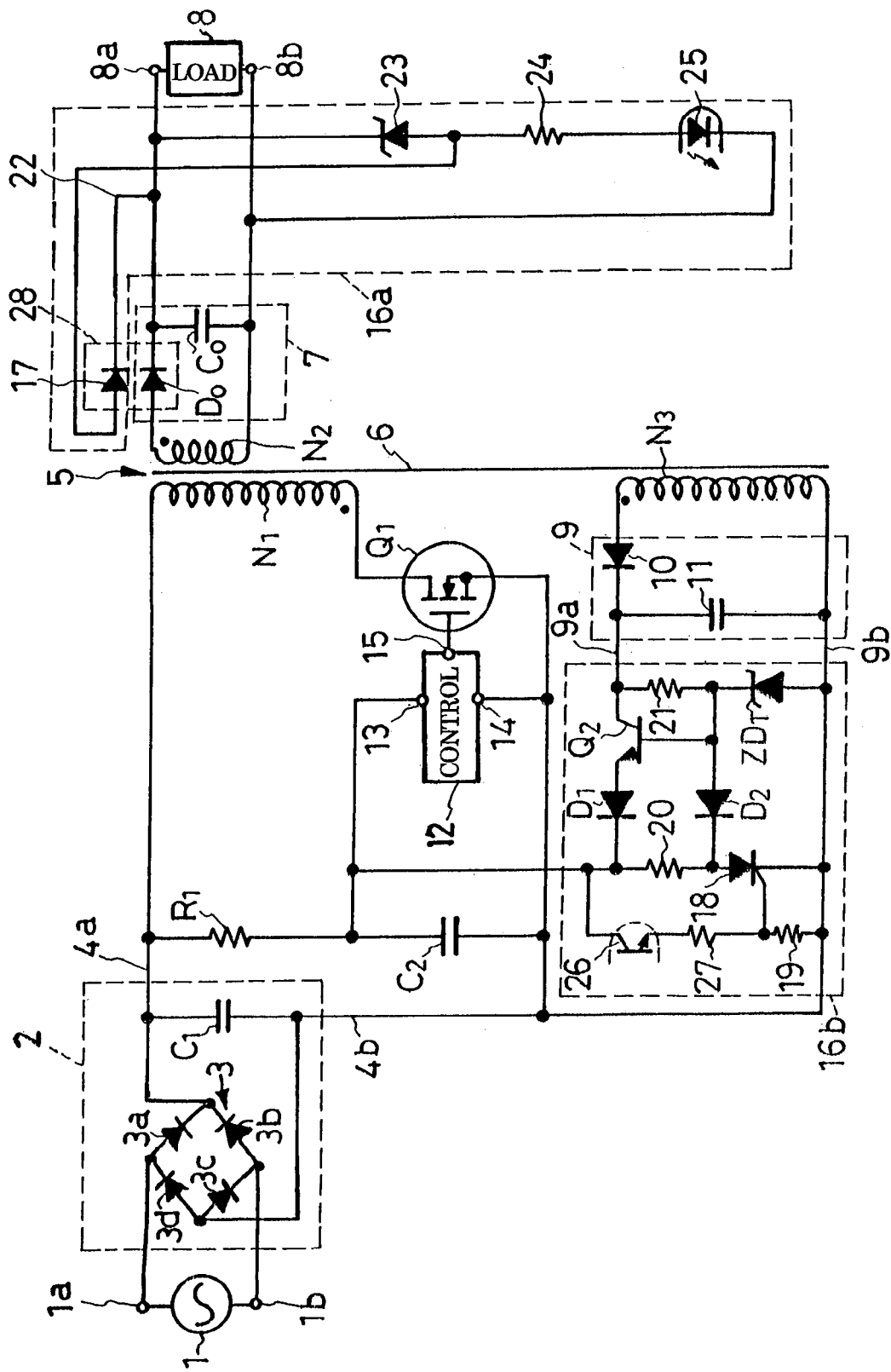
FIG. 3 is a schematic electrical diagram of a second preferred form of overheat-protected dc-to-dc converter according to the invention.

Embodiment of FIG. 3

The dc-to-dc converter shown in FIG. 3 by way of a second preferable embodiment of the invention incorporates two circuits $16_a$ and $16_b$ for overvoltage protection in addition to overheat protection. The circuits $16_a$ and $16_b$ will therefore be hereinafter referred to as the first and the second overvoltage/overheat protection circuit, respectively. This apparatus is akin to that of FIG. 1 in all the other details of construction.

The first overvoltage/overheat protection circuit $16_a$ includes the Schottky barrier diode 17 for temperature sensing. The Schottky barrier diode 17 is connected between the pair of dc output terminals $8_a$ and $8_b$ via a conductor 22, resistor 24 and light-emitting diode (LED) 25. Also connected between the pair of dc output terminals $8_a$ and $8_b$ is a serial circuit of a zener diode 23, resistor 24, and LED 25. The conductor 22 is intended for application of a reverse voltage to the Schottky barrier diode 17.

The zener diode 23 is connected in parallel with the Schottky barrier diode 17. The Schottky barrier diode 17 and zener diode 23 are so oriented as to be reverse biased by the voltage between the pair of dc output terminals $8_a$ and $8_b$. Consequently, there flow through the LED 25 both the current of the zener diode 23 and the reverse current of the Schottky barrier diode 17. It is thus seen that the LED 25 radiates in response not only to the dc output of the converter but to the reverse current of the Schottky barrier diode 17 as well.

Having the same temperature-dependent reverse current characteristic as that of its FIG. 1 counterpart explained in conjunction with FIG. 2, the Schottky barrier diode 17 is thermally coupled to the rectifying diode $D_0$ of the output rectifying and smoothing circuit 7, this rectifying diode being on the main current flow path of the dc-to-dc converter. The temperature of the rectifying diode $D_0$ varies approximately the same way as does the main switch $Q_1$, particularly when the power requirement of the load 8 is relatively high. For the purpose of overheat protection, therefore, the temperature of the rectifying diode $D_0$ may be relied upon as being representative of that of the entire dc-to-dc converter.

Figure 4:
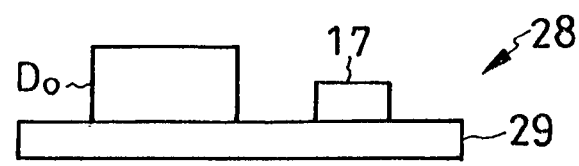
FIG. 4 is a diagrammatic illustration of how the Schottky barrier diode is thermally coupled to the rectifying diode in the FIG. 3 embodiment.

For thermally coupling together the Schottky barrier diode 17 and rectifying diode $D_0$, these parts may be manufactured as a single composite part shown in FIG. 4 and therein generally designated 28. It will be seen that the Schottky barrier diode 17 and rectifying diode $D_0$ are shown mounted side by side on a common baseplate 29 of thermally conducting material. Alternatively, the Schottky barrier diode 17 and rectifying diode $D_0$ may be wholly enveloped with an insulating material. Another alternative is to enclose these parts 17 and $D_0$ in one and the same metal-made package.

The second overvoltage/overheat protection circuit $16_b$ is similar in design to the overheat protector 16 of the FIG. 1 embodiment except that the Schottky barrier diode 17 in the latter is replaced by a serial connection of a phototransistor 26 and resistor 27. The phototransistor 26 is understood to be irradiated by the light issuing from the LED 25 of the first overvoltage/overheat protection circuit $16_a$.

Speaking functionally, the combination of the first and second overvoltage/overheat protection circuits $16_a$ and $16_b$ minus the Schottky barrier diode 17 constitutes an overvoltage protector. The combination of the overvoltage/overheat protection circuits $16_a$ and $16_b$ minus the zener diode 23 constitutes an overheat protector. The resistor 24, LED 25, phototransistor 26, and resistors 19 and 27 serve for reverse current detection of the Schottky barrier diode 17.

Operation of the FIG. 3 Embodiment

A comparison of FIGS. 1 and 3 will make it clear that both embodiments are alike in the method of conversion from one dc voltage to another. During such voltage conversion the zener diode 23 of the first overvoltage/overheat protection circuit $16_a$ will be nonconductive as long as the voltage between the pair of converter output terminals $8_a$ and $8_b$ is within a predefined range. The phototransistor 26 will be nonconductive, too, holding the thyristor 18 of the second overvoltage/overheat protection circuit $16_b$ untriggered.

In event the voltage between the pair of converter output terminals $8_a$ and $8_b$ builds up above its normal range for some reason or other, the zener diode 23 of the first overvoltage/overheat protection circuit $16_a$ will conduct thereby causing the LED 25 to be energized. Irradiated by the LED 25, the phototransistor 26 of the second overvoltage/overheat protection circuit $16_b$ will conduct with the consequent triggering of the thyristor 18. Thereupon the switch control circuit 12 will discontinue driving the main switch $Q_1$, just as when the thyristor 18 turns on in the FIG. 1 embodiment. Thus will the load 8 protected from the overvoltage.

The overheat protection feature of the FIG. 3 embodiment will not be tripped as long as the temperature of the Schottky barrier diode 17, and therefore that of the rectifying diode $D_0$ of the output rectifying and smoothing circuit 7, are less than the prescribed temperature of 120° C. or so. The reverse current of the Schottky barrier diode 17 will then be so low that the LED 25 will be incapable of initiating conduction through the thyristor 18 via the phototransistor 26. The main switch $Q_1$ will therefore be driven normally to keep the converter output voltage constant.

In the event of a rise in the temperature of the Schottky barrier diode 17 above the limit, its reverse current will surge up so much that the thyristor 18 of the second overvoltage/overheat protection circuit $16_b$ will be triggered via the optically coupled LED 25 and phototransistor 26. The switch control circuit 12 will then suspend the driving of the main switch $Q_1$, as has been detailed in connection with the FIG. 1 embodiment Thus will the dc-to-dc converter, the rectifying diode $D_0$ in particular, be saved from the overheat.

It will be appreciated that the overheat protector of FIG. 3 makes utmost use of the preexisting parts of the overvoltage protector. Protected against both overheat and overvoltage, the apparatus is nevertheless much simpler and inexpensive in construction than if the overheat and overvoltage protectors were totally independent of each other. An additional advantage is the close thermal coupling, accomplished through integrated mechanical construction, of the rectifying diode $D_0$ and Schottky barrier diode 17.

Figure 5:
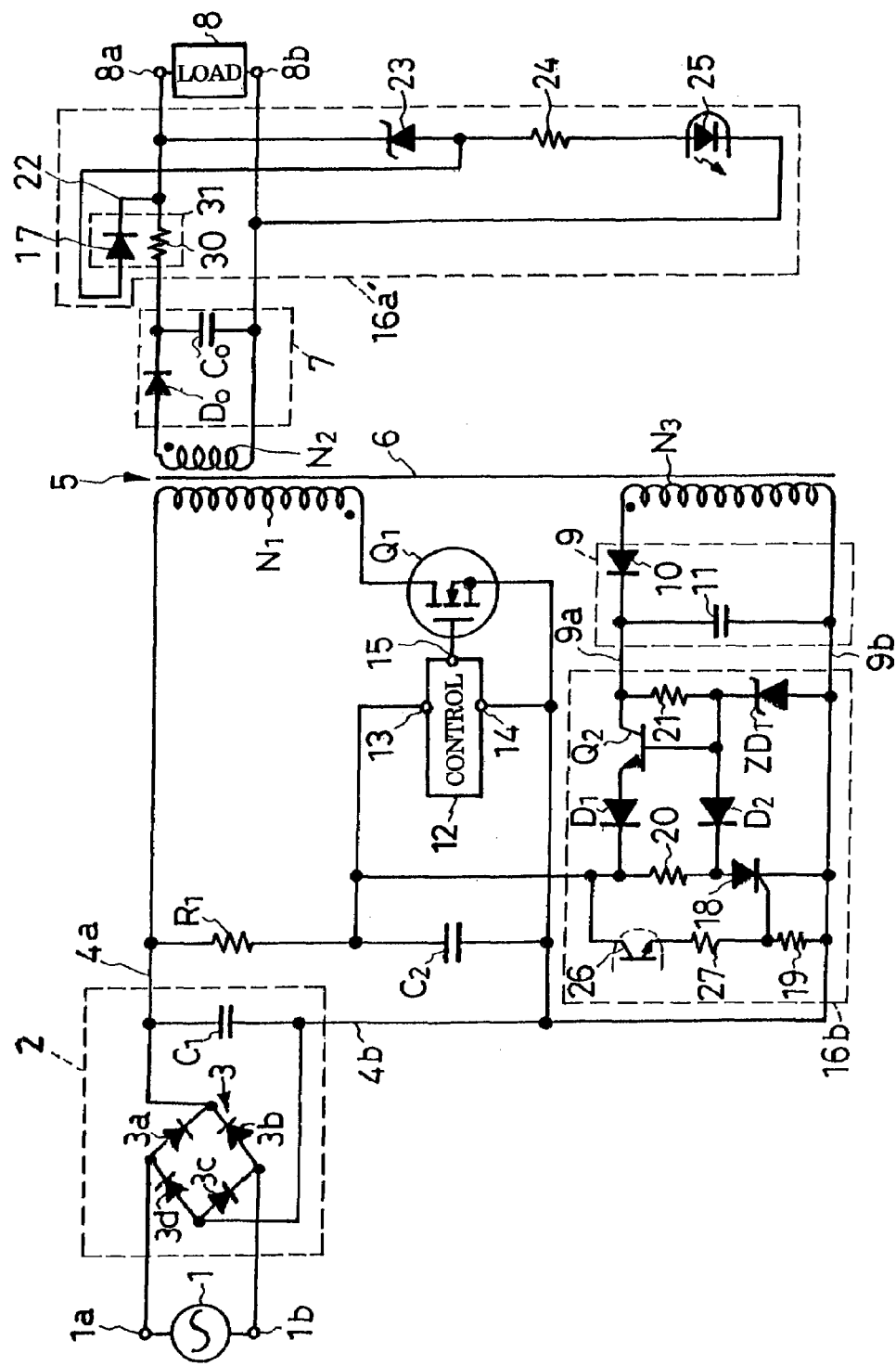
FIG. 5 is a schematic electrical diagram of a third preferred form of overheat-protected dc-to-dc converter according to the invention.

Embodiment of FIG. 5

This dc-to-dc converter features a modification $16_{a'}$ of the first overvoltage/overheat protection circuit $16_a$ of the FIG. 3 embodiment, all the other details of construction being as set forth above with reference to FIG. 3. The modified first overvoltage/overheat protection circuit $16_a'$ itself is similar in construction to its FIG. 3 counterpart $16_a$ except that the Schottky barrier diode 17 is thermally coupled to an output current detect resistor 30 instead of to the rectifying diode $D_0$. The thermally coupled combination of the Schottky barrier diode 17 and output current detect resistor 30 is generally designated 31.

The output current detect resistor 30 is connected between capacitor $C_0$ and converter output terminal $8_a$, that is, on the output or load current path of the dc-to-dc converter. Like the rectifying diode $D_0$ of the preceding embodiment, the resistor 30 varies in temperature approximately the same way as does the main switch $Q_1$, particularly when the power requirement of the load 8 is relatively high.

Although newly introduced in this embodiment of the invention, the output current detect resistor 30 is a standard part of this type of dc-to-dc converter. With its opposite extremities connected to the switch control circuit 12, the output current detect resistor 30 supplies thereto a signal indicative of the output current of the converter. The switch control circuit 12 conventionally controls the main switch $Q_1$ so as to lower the output current when the current across the output current detect resistor 30 grows above a predetermined level.

Figure 6:
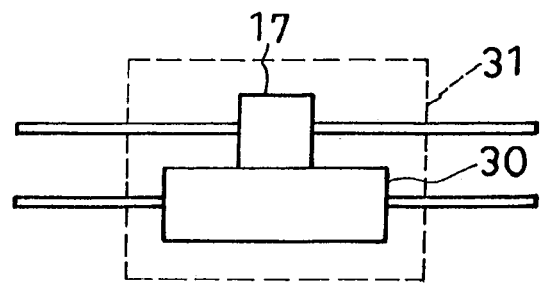
FIG. 6 is a diagrammatic illustration of how the Schottky barrier diode is thermally coupled to the output current detect resistor in the FIG. 5 embodiment.

FIG. 6 is explanatory of how the Schottky barrier diode 17 and output current detect resistor 30 may be thermally coupled together. It will be seen that the two parts 17 and 30 are directly mechanically joined to each other into a unitary part designated 31.

Operation of the FIG. 5 Embodiment

Thermally coupled as above to the output current detect resistor 30, the Schottky barrier diode 17 of the modified first overvoltage/overheat protection circuit $16_a'$ will show a sudden rise in the magnitude of its reverse current when that resistor heats up to the predefined temperature, just as when the output rectifying diode $D_0$ did in the FIG. 3 embodiment. The consequent increase in the output intensity of the LED 25 will cause a correspondingly greater amount of current to flow through the phototransistor 26 of the second overvoltage/overheat protection circuit $16_b$. This in turn will cause conduction through the thyristor 18, thereby switch control circuit 12 to suspend driving the current control switch $Q_1$ by way of overheat protection.

Figure 7:
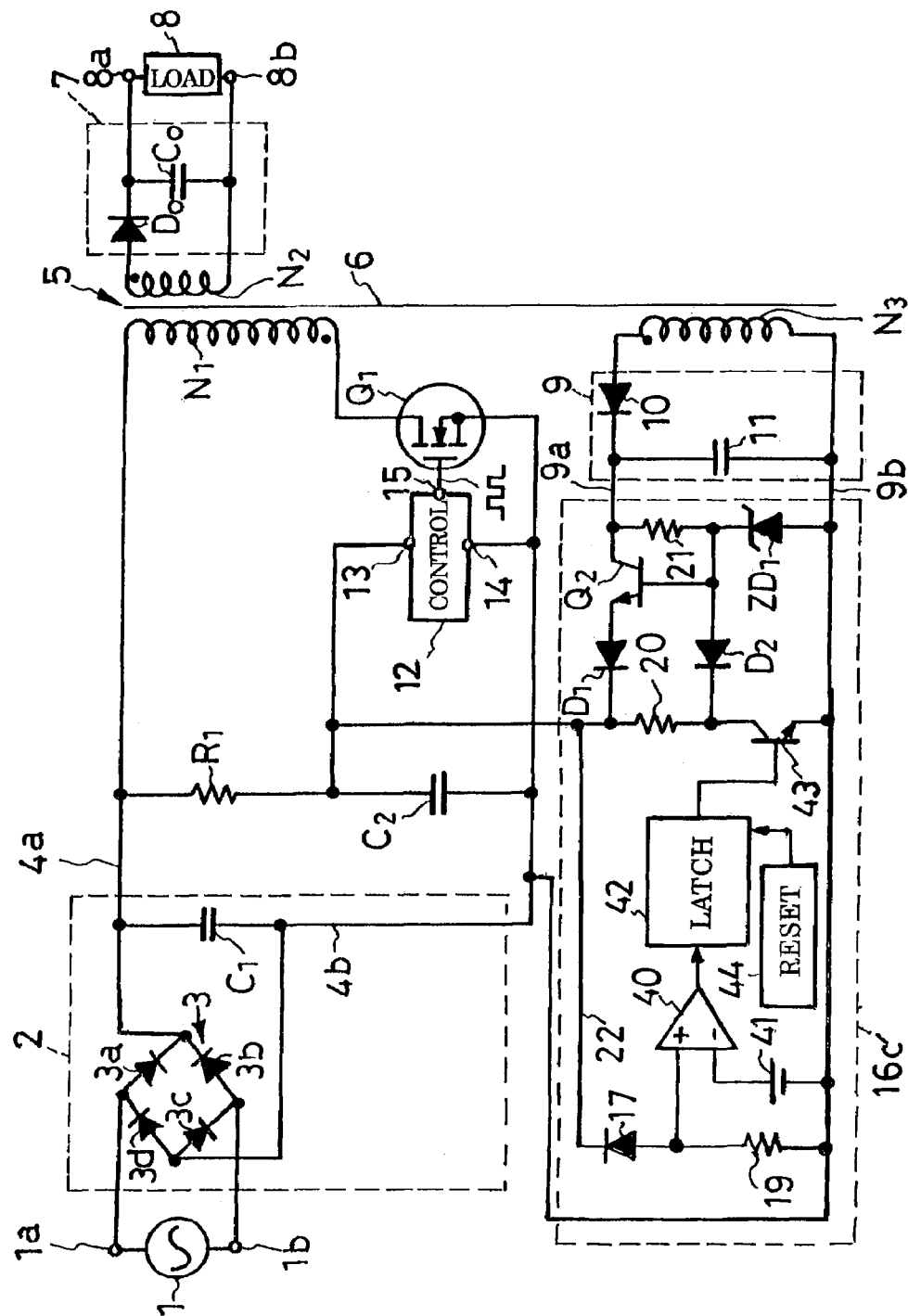
FIG. 7 is a schematic electrical diagram of a fourth preferred form of overheat-protected dc-to-dc converter according to the invention.

Embodiment of FIG. 7

Here is shown a further preferred form of dc-to-dc converter according to the invention which features a modified overheat protector $16_c$, all the other details of construction being as previously set forth in conjunction with FIG. 1. The modified overheat protector $16_c$ is akin to its FIG. 1 counterpart 16 except that the thyristor 18 of the latter is replaced by a combination of a comparator 40, reference voltage source 41, latch circuit 42, overheat protect switch 43, and reset circuit 44.

The comparator 40 has one input connected to the junction between Schottky barrier diode 17 and resistor 19, and another input connected to the reference voltage source 41. The comparator 40 is low when the reverse current of the Schottky barrier diode 17 is less than the predetermined level, because then the voltage across the resistor 19 is less than the reference voltage from its source 41. The comparator 40 will go high when the reverse current of the Schottky barrier diode 17 grows higher than the predetermined level as a result of the heating of the dc-to-dc converter in excess of the preassigned limit, as then the voltage across the resistor 19 will exceed the reference voltage.

Connected to the output of the comparator 40, the latch circuit 42 is comprised of a flip-flop, for example, for indefinitely holding the output from the comparator. The high output from the comparator 40, indicative of an excessive heating of the apparatus, is maintained by the latch circuit 42 until the latter is reset by the reset circuit 44, or until the unshown power switch of the apparatus is turned off or on.

The overheat protect switch 43 is shown as a transistor, having a collector connected to the first supply terminal 13 of the switch control circuit 12 via the resistor 20, an emitter connected to the second supply terminal 14 of the switch control circuit 12, and a base connected to the latch circuit 42. The overheat protect switch 43 is turned on, and held so, by the high output from the latch circuit 42. This closure of the overheat protect switch 43 is functionally equivalent to the conduction of the thyristor 18 of the FIG. 1 overheat protector 16, so that the transistor $Q_2$ of the modified overheat protector $16_c$ becomes nonconductive to prevent the switch control circuit 12 from driving the main switch $Q_1$. It is thus seen that the thyristor 18 of the FIG. 1 overheat protector 16 is substitutable by the comparator 40, reference voltage source 41, latch circuit 42, and overheat protect switch 43 of the FIG. 7 overheat protector $16_c$.

Possible Modifications

Despite the foregoing detailed disclosure it is not desired that the present invention be limited by the exact showing of the drawings or the description thereof. The following is a brief list of possible modifications, alterations or adaptations of the invention which are all believed to fall within the scope of the invention:

1. The Schottky barrier diode 17 of the FIG. 1 overheat protector 16 could be thermally coupled to the output rectifying diode $D_0$, a current detect resistor (not shown) connected in series with the transformer primary $N_1$, the resistor 30 (FIG. 5), the diodes $3_a$–$3_d$ of the input rectifier circuit 3, the smoothing capacitor $C_1$, or the capacitor $C_2$. The Schottky barrier diode 17 might be thermally coupled to the input rectifier diodes $3_a$–$3_d$ in a manner similar to that shown in FIG. 4, and to the current detect resistor in series wit the transformer primary $N_1$ in a manner similar to that shown in FIG. 6.
2. Two or more Schottky barrier diodes could be connected in parallel with each other in place of the single Schottky barrier diode 17 shown in FIG. 1 for sensing the temperatures of different parts of the apparatus. For example, one diode might be thermally coupled to the main switch $Q_1$, and another to the output rectifying diode $D_0$.
3. The transformer 5 could be provided with two or more secondary windings in the embodiments of both FIGS. 3 and 5 for simultaneously feeding as many loads. Each load circuit might then be furnished with its own first overvoltage/overheat protection circuit $16_a$, and the optical outputs from all such first overvoltage/overheat protection circuits $16_a$ might be applied to the phototransistor 26 of the single second overvoltage/overheat protection circuit $16_b$ on the input side of the transformer 5.
4. The output conductor $9_a$ of the switch control voltage rectifying and smoothing circuit 9 could be connected directly to the capacitor $C_2$, thereby dispensing with the transistor $Q_2$, diodes $D_1$ and $D_2$, resistor 21, and zener diode $ZD_1$.
5. The thyristor 18 of the overheat protector 16 or second overvoltage/overheat protection $16_b$ could be replaced by other types of switching devices that when turned on, remain so until made to open by the methods indicated in this specification.
6. The overheat protector 16 may be integrated, either in whole or in part, into a unitary component.
7. The first and the second overvoltage/overheat protection circuits may also be integrated, either in whole or in part, into a unitary component.
8. In the FIGS. 1, 3 and 5 embodiments the connection of the anode of the thyristor 18 to the terminal 13 of the switch control circuit 12 via the resistor 20 is not an absolute requirement; instead, the anode of the thyristor 18 could be connected only to the base of the transistor $Q_2$, either directly or via the diode $D_2$. It is desirable in this case to connect one extremity of the startup resistor $R_1$ to the output conductor $4_a$ of the input rectifying and smoothing circuit 2, and the other extremity of the startup resistor to the collector or base of the transistor $Q_2$.
9. In the FIG. 7 embodiment, too, the overheat protect switch 43 of the modified overheat protector $16_c$ need not necessarily have its collector connected to the supply terminal 13 of the switch control circuit 12 via the resistor 20; instead, the collector of the switch 43 could be connected only to the base of the transistor $Q_2$ via the diode $D_2$.
10. The main switch $Q_1$ need not necessarily be set out of operation by disconnecting the switch control circuit 12 from its power supply as by the thyristor 18 or overheat protect switch 43. An obvious alternative might be to connect an on-off switch between switch control circuit 12 and main switch $Q_1$ and to actuate the switch either by the voltage across the resistor 19 or by the output from the latch circuit 42, FIG. 7. Another possible alternative is to disable the means, not shown, included in the switch control circuit 12 for creating the switch control signal, again either by the voltage across the resistor 19 or by the output from the latch circuit 42.
11. The main switch $Q_1$ as the current control means could be replaced by other types of switching devices or current control devices.
12. The invention is applicable to a variety of electric apparatuses other than the dc-to-dc converter shown, provided that such apparatuses have current control means functionally equivalent to the main switch $Q_1$ and switch control circuit 12 of the dc-to-dc converter.

What is claimed is:

1. An overheat protector for an electric apparatus having current control means for controlling current flow in the apparatus, the overheat protector comprising:
    (a) a Schottky barrier diode for sensing the temperature of a preselected point on the electric apparatus by providing reverse current having a magnitude indicative of the temperature of the preselected point;
    (b) voltage application means for applying a reverse voltage to the Schottky barrier diode;
    (c) reverse current detect means connected to the Schottky barrier diode for providing an output indicative of the temperature of the preselected point on the electric apparatus on the basis of the magnitude of the reverse current of the Schottky barrier diode; and
    (d) overheat protect means connected to the reverse current detect means for setting the current control means of the electric apparatus out of operation when the temperature of the preselected point on the electric apparatus exceeds a predetermined limit, wherein the overheat protect means further holds the setting of the current control means.

2. An electric apparatus comprising current control means for controlling current flow in the apparatus, and an overheat protector for protecting the electric apparatus against overheating by disabling the current control means, the overheat protector comprising:
    (a) a Schottky barrier diode for sensing the temperature of a preselected point on the electric apparatus by providing reverse current having a magnitude indicative of the temperature of the preselected point;
    (b) voltage application means for applying a reverse voltage to the Schottky barrier diode;
    (c) reverse current detect means connected to the Schottky barrier diode for providing an output indicative of the temperature of the preselected point on the electric apparatus on the basis of the magnitude of the reverse current of the Schottky barrier diode; and
    (d) overheat protect means connected to the reverse current detect means and the current control means for setting the latter out of operation when the temperature of the preselected point on the electric apparatus exceeds a predetermined limit, wherein the overheat protect means further holds the setting of the current control means.

3. An electric apparatus as defined in claim 2, wherein the current control means include a main switch for controlling current flow in the apparatus, and wherein the Schottky barrier diode is thermally coupled to the main switch.

4. An electric apparatus as defined in claim 2, wherein the apparatus further comprises a rectifying diode on a current path through the apparatus, and wherein the Schottky barrier diode is thermally coupled to the rectifying diode.

5. An electric apparatus as defined in claim 4, wherein the Schottky barrier diode and the rectifying diode are mounted on a common baseplate comprising thermally conductive material.

6. An electric apparatus as defined in claim 2, wherein the apparatus further comprises an output current detect resistor on a current path through the apparatus, and wherein the Schottky barrier diode is thermally coupled to the output current detect resistor.

7. An electric apparatus as defined in claim 6, wherein the Schottky barrier diode and the current detect resistor are thermally coupled by being mechanically joined to each other.

8. A dc-to-dc converter protected against overheating, comprising:
   (a) a dc power supply;
   (b) a transformer having a primary winding and a secondary winding which are electromagnetically coupled to each other, the primary winding being connected across the do power supply;
   (c) a main switch connected in series with the primary winding of the transformer;
   (d) a switch control circuit for controllably actuating the main switch;
   (e) switch control power supply means connected to the switch control circuit for powering the same;
   (f) an output rectifying and smoothing circuit connected across the secondary winding of the transformer;
   (g) a Schottky barrier diode for sensing the temperature of a preselected point on the dc-to-dc converter by providing reverse current having a magnitude indicative of the temperature of the preselected point;
   (h) voltage application means for applying a reverse voltage to the Schottky barrier diode;
   (i) reverse current detect means connected to the Schottky barrier diode for providing an output indicative of the temperature of the preselected point on the dc-to-dc converter on the basis of the magnitude of the reverse current of the Schottky barrier diode; and
   (j) overheat protect means connected to the reverse current detect means and the switch control circuit for causing the latter to discontinue actuation of the main switch and to hold the discontinued actuation of the main switch when the temperature of the preselected point on the electric apparatus exceeds a predetermined limit.

9. A dc-to-dc converter as defined in claim 8, wherein the reverse voltage is applied by the voltage application means to the Schottky barrier diode from the switch control power supply means.

10. A dc-to-dc converter as defined in claim 8, wherein the reverse current detect means comprises a reverse current detect resistor connected in series with the Schottky barrier diode.

11. A dc-to-dc converter as defined in claim 8, wherein the output rectifying and smoothing circuit has a pair of dc output terminals connected thereto, and wherein the reverse voltage is applied by the voltage application means to the Schottky barrier diode from the pair of dc output terminals.

12. A dc-to-dc converter as defined in claim 11, wherein the reverse current detect means comprises:
   (a) a light-emitting device connected in series with the Schottky barrier diode;
   (b) a light receptor optically coupled to the light-emitting device and connected to the switch control power supply means; and
   (c) a reverse current detect resistor connected in series with the light receptor.

13. A dc-to-dc converter as defined in claim 10 or 12, wherein the overheat protect means comprises an overheat protect switch connected between a pair of supply terminals of the switch control circuit, the overheat protect switch having a control terminal connected to the reverse current detect resistor for short-circuiting the pair of supply terminals of the switch control circuit when the magnitude of the reverse current of the Schottky barrier diode exceeds a predetermined limit, wherein the overheat protect switch further holds the conductive state.

14. A dc-to-dc converter as defined in claim 10 or 12, wherein the overheat protect means comprises:
   (a) a switch control power supply cutoff switch connected between the switch control power supply means and one of a pair of supply terminals of the switch control circuit; and
   (b) means connected to the reverse current detect resistor and the switch control power supply cutoff switch for opening and holding open the latter when the magnitude of the reverse current of the Schottky barrier diode exceeds a predetermined limit.

15. A dc-to-dc converter as defined in claim 10 or 12, wherein the overheat protect means comprises:
   (a) an overheat protect switch having a first terminal connected via a resistor to one of a pair of supply terminals of the switch control circuit, a second terminal connected to the other of the pair of supply terminals of the switch control circuit, and a control terminal connected to the reverse current detect resistor for short-circuiting the pair of supply terminals of the switch control circuit and holding the short-circuit of the pair of supply terminals when the magnitude of the reverse current of the Schottky barrier diode exceeds a predetermined limit; and
   (b) a switch control power supply cutoff switch having a first terminal connected to the switch control power supply means, a second terminal connected to said one of the pair of supply terminals of the switch control circuit, and a control terminal connected to said first terminal of the overheat protect switch.

16. A dc-to-dc converter as defined in claim 10 or 12, wherein the overheat protect means comprises:
   (a) a source of a reference voltage;
   (b) a comparator having one input connected to the reference voltage source, and another input connected to the reverse current detect resistor;
   (c) a holding circuit connected to the comparator for holding an output produced thereby when the magnitude of the reverse current of the Schottky barrier diode exceeds a predetermined limit; and
   (d) an overheat protect switch connected between a pair of supply terminals of the switch control circuit, the overheat protect switch having a control terminal connected to the holding circuit for shot-circuiting the supply terminals of the switch control circuit when the magnitude of the reverse current of the Schottky barrier diode exceeds the predetermined limit.

17. A dc-to-dc converter as defined in claim 10 or 12, wherein the overheat protect means comprises:
   (a) a switch control power supply cutoff switch connected between one of a pair of output terminals of the switch control power supply means and one of a pair of supply terminals of the switch control circuit;
(b) a source of a reference voltage;
(c) a comparator having one input connected to the reference voltage source, and another input connected to the reverse current detect resistor;
(d) a holding circuit connected to the comparator for holding an output produced thereby when the magnitude of the reverse current of the Schottky barrier diode exceeds a predetermined limit; and
(e) an overheat protect switch connected between a control terminal of the switch control power supply cutoff switch and the other of the pair of output terminals of the switch control power supply means, the overheat protect switch having a control terminal connected to the holding circuit for opening the switch control power supply cutoff switch when the magnitude of the reverse current of the Schottky barrier diode exceeds the predetermined limit.

18. A dc-to-dc converter as defined in claim 10 or 12, wherein the overheat protect means comprises:
(a) a source of a reference voltage;
(b) a comparator having one input connected to the reference voltage source, and another input connected to the reverse current detect resistor;
(c) a holding circuit connected to the comparator for holding an output produced thereby when the magnitude of the reverse current of the Schottky barrier diode exceeds a predetermined limit;
(d) an overheat protect switch having a first terminal connected via a resistor to one of a pair of supply terminals of the switch control circuit, a second terminal connected to the other of the pair of supply terminals of the switch control circuit, and a control terminal connected to the holding circuit for shot-circuiting the supply terminals of the switch control circuit when the magnitude of the reverse current of the Schottky barrier diode exceeds the predetermined limit; and
(e) a switch control power supply cutoff switch having a first terminal connected to one of a pair of output terminals of the switch control power supply means, a second terminal connected to said one supply terminal of the switch control circuit, and a control terminal connected to said first terminal of the overheat protect switch.

19. A dc-to-dc converter as defined in claim 8, wherein the switch control power supply means include:
(a) a capacitor connected between a pair of supply terminals of the switch control circuit; and
(b) means for charging the capacitor.

20. A dc-to-dc converter as defined in claim 11, further comprising a zener diode connected in parallel with the Schottky barrier diode and oriented to be reverse biased by the voltage between the pair of dc output terminals of the output rectifying and smoothing circuit.

21. A dc-to-dc converter as defined in claim 8, wherein the output rectifying and smoothing circuit comprises a rectifying diode connected to the secondary winding of the transformer, and wherein the Schottky barrier diode is thermally coupled to the rectifying diode.

22. A dc-to-dc converter as defined in claim 21, wherein the Schottky barrier diode and the rectifying diode are thermally coupled by being mechanically joined to each other.

23. A dc-to-dc converter as defined in claim 21, wherein the apparatus further comprises an output current detect resistor connected to the rectifying diode, and wherein the Schottky barrier diode is thermally coupled to the output current detect resistor.

24. A dc-to-dc converter as defined in claim 23, wherein the Schottky barrier diode and the current detect resistor are thermally coupled by being mechanically joined to each other.

25. An overheat protector as defined in claim 1, wherein the overheat protect means holds the setting of the current control means until power to the overprotect means is interrupted.

26. An electric apparatus as defined in claim 2, wherein the overheat protect means holds the setting of the current control means until power to the overprotect means is interrupted.

27. A dc-to-dc converter as defined in claim 8, wherein the overheat protect means holds the discontinued actuation of the main switch until power to the overprotect means is interrupted.

* * * * *